(12) United States Patent
Wolfe et al.

(10) Patent No.: US 6,996,086 B2
(45) Date of Patent: Feb. 7, 2006

(54) RADIO ACCESS NETWORK WITH MESHED RADIO BASE STATIONS

(75) Inventors: Charles Wolfe, Encinitas, CA (US); Larry Schnack, San Diego, CA (US)

(73) Assignee: Telefonaktiebolaget LM Ericsson (publ), (SE)

( * ) Notice: Subject to any disclaimer, the term of this patent is extended or adjusted under 35 U.S.C. 154(b) by 792 days.

(21) Appl. No.: 09/843,204

(22) Filed: Apr. 26, 2001

(65) Prior Publication Data

US 2002/0159409 A1   Oct. 31, 2002

(51) Int. Cl.
   *H04Q 7/24* (2006.01)
(52) U.S. Cl. .................................. 370/338; 370/310.2
(58) Field of Classification Search ................ 370/310, 370/310.2, 328, 338, 386, 389, 395.31, 395.3, 370/400–402, 329, 238, 248, 238.1, 406, 370/310.1, 332, 341, 352–358, 254, 255
   See application file for complete search history.

(56) References Cited

U.S. PATENT DOCUMENTS

| | | | |
|---|---|---|---|
| 6,064,891 A | 5/2000 | Aucoeur | |
| 6,122,263 A | 9/2000 | Dahlin et al. | |
| 6,167,271 A | 12/2000 | Parker et al. | |
| 6,167,279 A | 12/2000 | Chang et al. | |
| 6,816,706 B1 * | 11/2004 | Hohnstein et al. | ............ 455/25 |

FOREIGN PATENT DOCUMENTS

| WO | WO 01/19127 A2 * | 3/2001 |
|---|---|---|
| WO | WO 0119127 | 3/2001 |

* cited by examiner

*Primary Examiner*—Brenda Pham
(74) *Attorney, Agent, or Firm*—Coats & Bennett, P.L.L.C.

(57) ABSTRACT

A wireless communication network supporting mobile communications includes a mesh of radio base stations (RBSs) interconnected as packet data routing network. The RBSs are RF-coupled together so that adjacent ones may relay communications traffic to each other. By attaching to the mesh of radio base stations at one or more attachment points, communications traffic may be routed between a base station controller and any one of the radio base stations in the mesh based on configuring the appropriate route through the mesh. Preferably, the mesh is implemented as an IP-based routing network with each radio base station in the mesh operating as an addressable routing node within the mesh.

14 Claims, 5 Drawing Sheets

| FIELD | VALUES |
|---|---|
| DESTINATION | — |
| ROUTE MASK | — |
| NEXT HOP | — |
| IF INDEX (PORT) | — |
| METRIC | — |
| ROUTE TYPE | — |
| SOURCE OF ROUTE | — |
| ROUTE AGE | — |
| ROUTE INFORMATION | — |
| MTU | — |

RADIO ACCESS NETWORK WITH MESHED RADIO BASE STATIONS

BACKGROUND OF THE INVENTION

The present invention generally relates to wireless communication systems and particularly relates to the use of router-based radio base stations in a base station network.

Wireless communication systems, such as cellular communication systems, typically comprise some type of radio access network that allows users of mobile terminals operating within the network's service area to communicate with other mobile terminal users, and users of other communication networks, such as the Public Switched Telephone Network (PSTN). In cellular communication systems, the radio access network typically comprises at least one base station controller and a number of radio base stations. Typically each radio base station provides coverage over a defined area, referred to as a "cell," and connects to the base station controller through a landline link, such as T1/E1, or by some line-of-sight wireless link, such as microwave.

The radio base stations are usually arranged such that the cells provide the best possible coverage over the entirety of the service area. Even so, there are oftentimes smaller, isolated areas within one or more cells where service is unavailable or of reduced quality. This may be particular true in urban areas with rows of tall buildings that block signals and create coverage gaps. Other areas, such as in and around malls or other large, enclosed structures, also may have poor coverage.

One approach to providing coverage in such areas involves the use of "pico" radio base stations (RBSs). Pico denotes the relatively small coverage area of the typical pico RBS. Usually, a number of pico RBSs are distributed within an area where coverage would otherwise be a problem. For example, one or more pico RBSs may be distributed within a shopping mall to provide communication coverage.

Although the use of pico RBSs permits more flexibility in terms of radio coverage, certain limitations affect their use. For example, the typical pico RBS requires a dedicated communications link back to the base station controller, which link is commonly implemented as a T1/E1 line. Providing such connections may be problematic, particularly in crowded urban installations. Moreover, costs associated with providing and maintaining landline links (e.g., T1/E1) to a potentially large number of associated pico RBSs are often prohibitive.

BRIEF SUMMARY OF THE INVENTION

The present invention comprises a method and apparatus for providing radio communication coverage in a given area by implementing a mesh of radio base stations (RBSs). Each RBS in the mesh includes a mobile interface for communicating with one or more mobile terminals operating in its coverage area, and a wireless backhaul interface for communicating with other RBSs in the mesh. At least one RBS in the mesh additionally uses its backhaul interface to communicate with a mesh attachment point (MAP), which provides a communications link to a base station controller (BSC). Multiple MAPs can enhance redundancy and load balancing between the mesh and the BSC.

Preferably, the mesh forms a portion of a packet data radio access network (RAN) so that each RBS in the mesh functions as a packet data router. For example, the network may be Internet protocol (IP) based and each RBS may function as an IP router. Thus, packet data for a particular mobile terminal is sent by the BSC to a MAP, which functions as a gateway for the RBS mesh. The packet data is then routed through the mesh, preferably using the best Quality-of-Service (Qos) path, until it reaches the specific RBS or RBSs serving that particular mobile terminal. Conversely, the packet data from a particular mobile terminal is routed from its supporting RBS or RBSs in the mesh, back through any intervening RBSs to reach a MAP, which then passes the packet data to the BSC.

The coverage area of each RBS within the mesh is typically small, defining what may be referred to as a "pico cell." Basing the mesh backhaul communications on RF links eliminates the need for wireline support (e.g., T1/E1 connection) at each RBS site, greatly simplifying implementation of the mesh. In addition to its relative ease of installation, the mesh provides a number of operating advantages. By functioning as packet data routers, the RBSs comprising the mesh form a fault tolerant IP-based routing network for moving packet data to and from the various mobile terminals supported by the mesh. Data for any one mobile terminal may be routed any number of ways through the mesh, and the routing may change dynamically. This allows for fault tolerance in terms of routing around failed RBSs in the mesh, as well as allowing load balancing by shifting route paths to avoid congested RBSs.

DETAILED DESCRIPTION OF THE INVENTION

Figure 1:
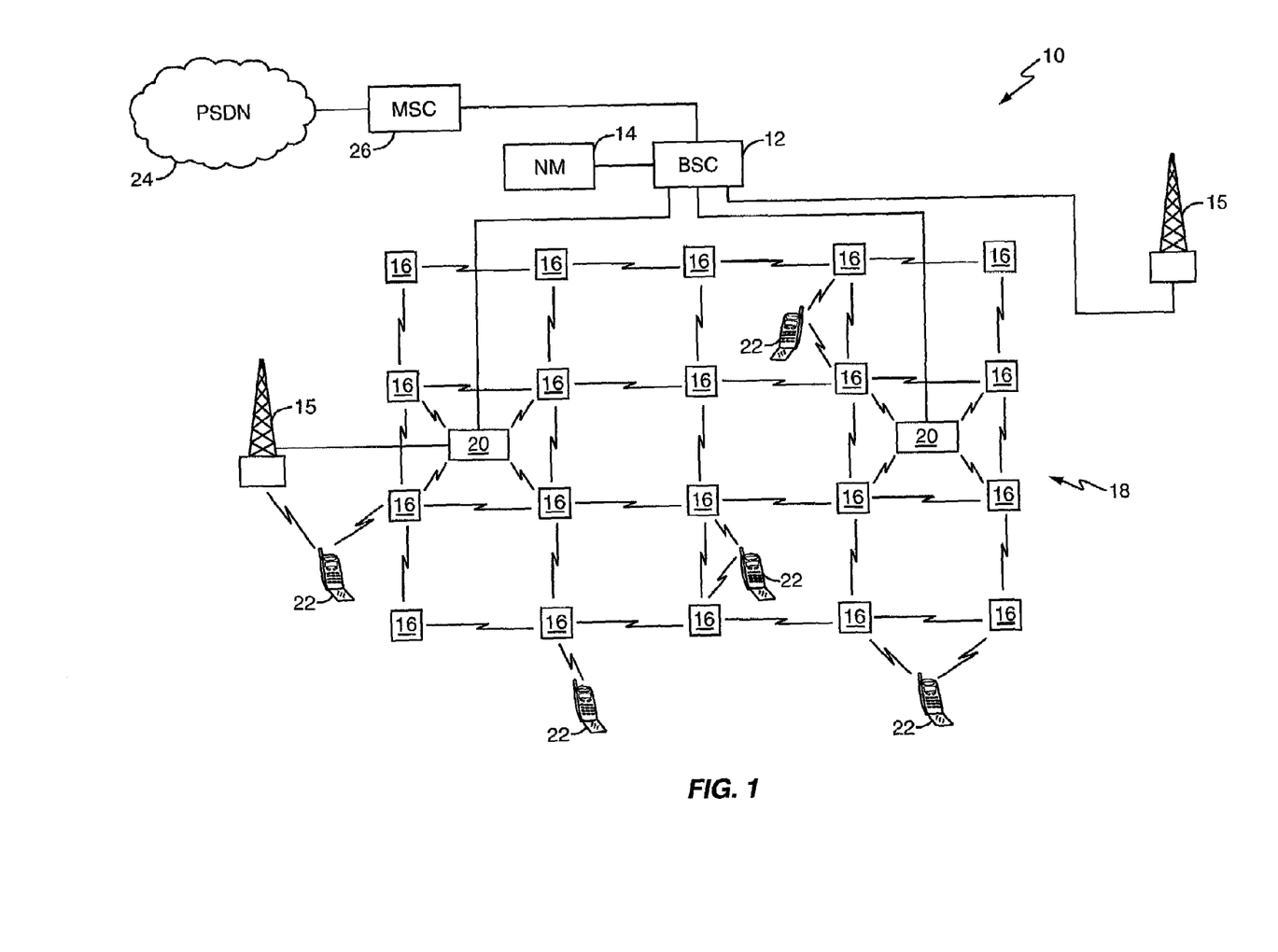
FIG. 1 is a diagram of an exemplary radio access network including a meshed network of radio base stations.

FIG. 1 illustrates a radio access network (RAN) generally referred to by the numeral 10. The network 10 comprises a base station controller (BSC) 12, a network manager 14, one or more radio base stations (RBSs) 15 of a first type, a plurality of RBSs 16 of a second type forming a mesh network 18, and one or more mesh attachment points (MAPs) 20. The RAN 10 permits users of mobile terminals 22 to communicate with other mobile terminal users, and with users of communication devices or services associated with a Public Switched Data Network (PSDN) 24, such as the Internet, PSTN, or some combination thereof, which is accessible to the RAN 10 through a mobile switching center (MSC) 26.

In the context of the following discussion, it is assumed that the RAN 10 is a packet data network and that the MSC 26 has packet data switching capability. As such, communication between the mobile terminals 22 and the RAN 10 is also packet based, providing any number of services, such as Web browsing, messaging, voice-over-IP (VoIP), and the like. Evolving wireless communication standards, such as the competing third-generation (3G) CDMA standards, cdma2000 and Wideband CDMA (W-CDMA), may be adapted to use IP-based packet switching for all voice and data traffic carried by the RAN 10. While it may be more efficient for packet-based communication to extend to the mobile terminals 22, it is not necessary for practicing the present invention. That is, the RBSs 15 and 16 are not required to communicate with mobile terminals 22 using packet-based communications.

The RAN 10 as shown includes two type of RBSs 15 and 16. The first type includes both "micro" and "macro" RBSs 15 that provide service coverage for small or large cells as needed, and operate outside the mesh 18. The mesh 18 is formed from a plurality of the second type of RBSs 16, referred to as a "pico" RBSs, indicating that each one provides coverage for a relatively small cell. As an example, each pico RBS 16 may have an effective coverage radius of a half kilometer or less. Because the bulk of this discussion regarding radio base stations focuses on the mesh 18, any subsequent reference herein to RBSs may be taken as referring to one of the pico RBSs 16 comprising the mesh 18, unless specified otherwise.

The mesh 18 functions as an IP-based routing network, with each RBS 16 serving as both an access point for mobile terminals 22 operating within its coverage area and as a router within the mesh 18. In its capacity as a router, each RBS 16 may route packet data to and from other RBSs 16 as needed. To better understand this, it is helpful to contrast operation of RBSs 16 within the mesh 18 with that of RBSs 15, which operate outside the mesh 18.

In an illustrative arrangement, one RBS 15 connects to the BSC 12 through a MAP 20, while the other RBS 15 directly couples to the BSC 12. Whether coupled through a MAP 20 or coupled directly, each RBS 15 functions independently of the other RBSs 15 and carries packet data traffic only for the mobile terminals 22 it is supporting. While included in a typical RAN 10, the present invention does not require the presence of RBSs 15. In contrast to RBSs 15, each RBS 16 within the mesh 18 carries packet data for any mobile terminal 22 that it is supporting, but also serves as an IP router for packet data intended for other RBS 16 within the mesh 18.

Positioning of the MAPs 20 within the mesh 18 determines which of the RBSs 16 are in direct radio contact with a MAP 20. An RBS 16 within the mesh 18 that is not in direct radio communication with a MAP 20 relies on other RBSs 16 within the mesh 18 to relay packet data between it and the MAP 20. By employing IP-routing techniques, the mesh 18 represents a fault-tolerant and flexible routing fabric for interconnecting the plurality of RBSs 16 comprising the mesh 18. These and other benefits, such as the ability to implement load sharing between RBSs 16 within the mesh 18, are more fully explored later herein.

Figure 2:
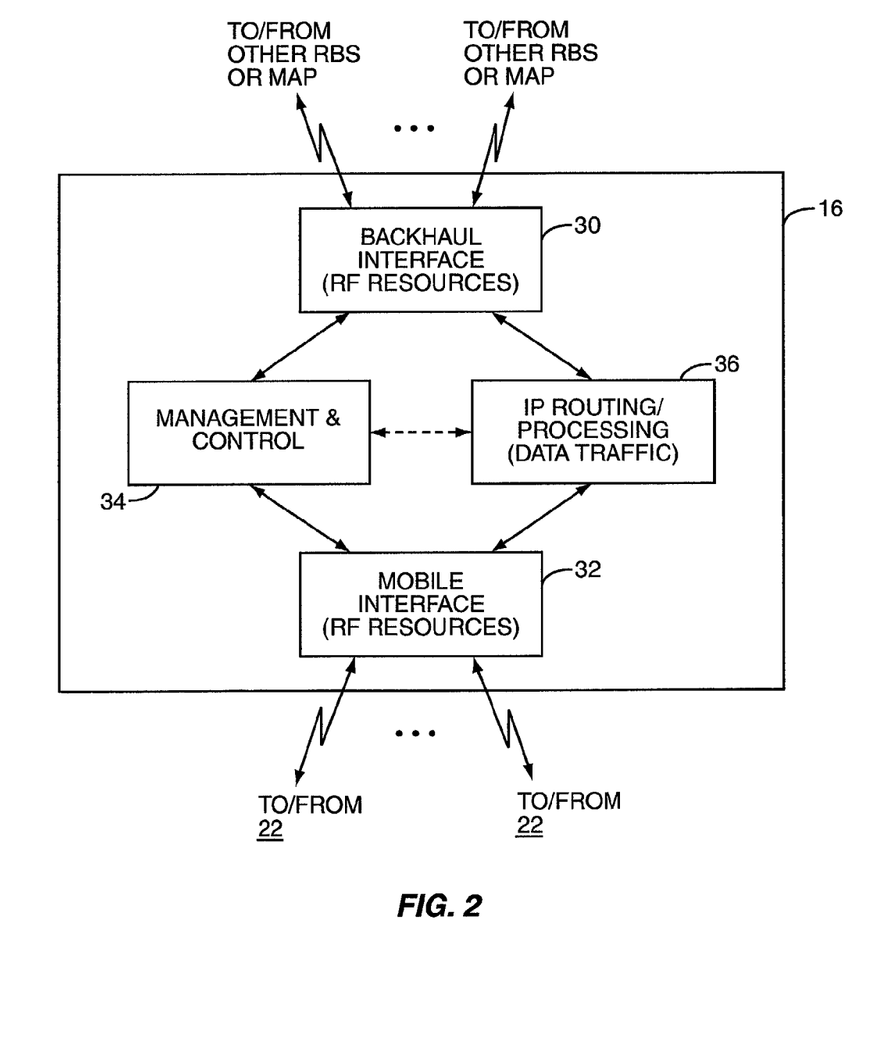
FIG. 2 is diagram of an exemplary radio base station for use in the mesh of FIG. 1.

FIG. 2 is a diagram of exemplary, simplified architecture for an RBS 16, which is used as an example to explain the operation of the mesh 18. The RBS 16 includes first and second radio interfaces 30 and 32, respectively, a controller 34, and an IP router 36. The first radio interface 30 is hereinafter referred to as the "backhaul interface" 30, as its function is to communicatively couple the RBS 16 to other RBS 16 and to MAPs 20. Thus, the backhaul interface 30 provides the communications link for carrying packet data into and out of the RBS 16. Communication links between the RBSs 16 are referred as a "wireless backhaul mesh." The wireless backhaul mesh may comprise RF links between RBSs 16 that are in the same RF frequency band as used to communicate with the mobile terminals 22, or may be based on a different frequency band and communication scheme. As an example, the backhaul interface 30 may comprise RF transceiver resources configured to operate in the Industrial-Scientific-Medical (ISM) band, which specifies spread spectrum communications in the 2.45 GHz spectrum. Substantial flexibility exists in terms of configuring the RF resources used to implement the backhaul mesh.

The second radio interface 32 is hereinafter referred to as the "mobile interface" 32, as its function is to communicate with one or more mobile terminals 22. Thus, the mobile interface 32 provides the standardized wireless air interface supporting communication with the mobile terminals 22. Here, "standardized wireless air interface" denotes an agreed upon communication type and protocol for signaling between RBSs 16 and mobile terminals 22, and may include, for example, any of the developing 3G standards, or evolutionary standards supporting packet data derived from them. Thus, the mobile interface 32 comprises RF transceiver resources configured in accordance with one or more desired air interface standards for support of a plurality of mobile terminals 22.

Communications traffic (packet data) to and from the mobile terminals 22 is transmitted and received, respectively, by the mobile interface 32. The mobile interface 32 includes RF resources (e.g., transmitters and receivers) for supporting communication with a number of mobile terminals 22. Depending upon implementation, mobile terminal packet data may pass between the controller 34 and the mobile interface 32, or may pass directly between the router 36 and the mobile interface 32. It may be that the controller 34 is itself capable of sending and receiving packet data. With this configuration, control packet data (e.g., configuration and control information) may be sent and received by the controller 34, while traffic data is routed through the router 36.

The router 36 sends mobile terminal packet data (traffic) through the backhaul interface 30 as IP-based packet data. That data may pass directly to a MAP 20, or may pass to another RBS 16, which may relay it to another RBS 16 and so on until the data reaches a MAP 20, where it is passed to the BSC 12.

In addition to supporting communications traffic processing, the controller 34 generally controls timing circuitry that provides timing and synchronization functions that allow the RBS 16 to function synchronously within the RAN 16 and accurately generate the required carrier frequencies when transmitting to the mobile terminals 22. The BSC 12 may provide timing information to one or more RBSs 16 in the mesh 18 via their backhaul interfaces 30. Further, RBSs 16 may share timing data or cross-synchronize based on exchanging data throughout the mesh 18.

The BSC 12 communicates with the RBS 16 through one or more MAPs 20. In this capacity, the MAPs 20 function as router/concentrators managing the IP-based packet data traffic between the BSC 12 and the mesh 18. As noted, the MAPs 20 communicatively couple via RF signaling to one or more RBSs 16 within the mesh 18. However, the connection between the MAPs 20 and the BSC 12 typically comprise high-capacity landline links such as T1/E1 links, or may be based on microwave communication links. Links of this type provide sufficient communication bandwidth to support the aggregate volume of mobile terminal communication traffic supported by the mesh 18.

Figure 3:
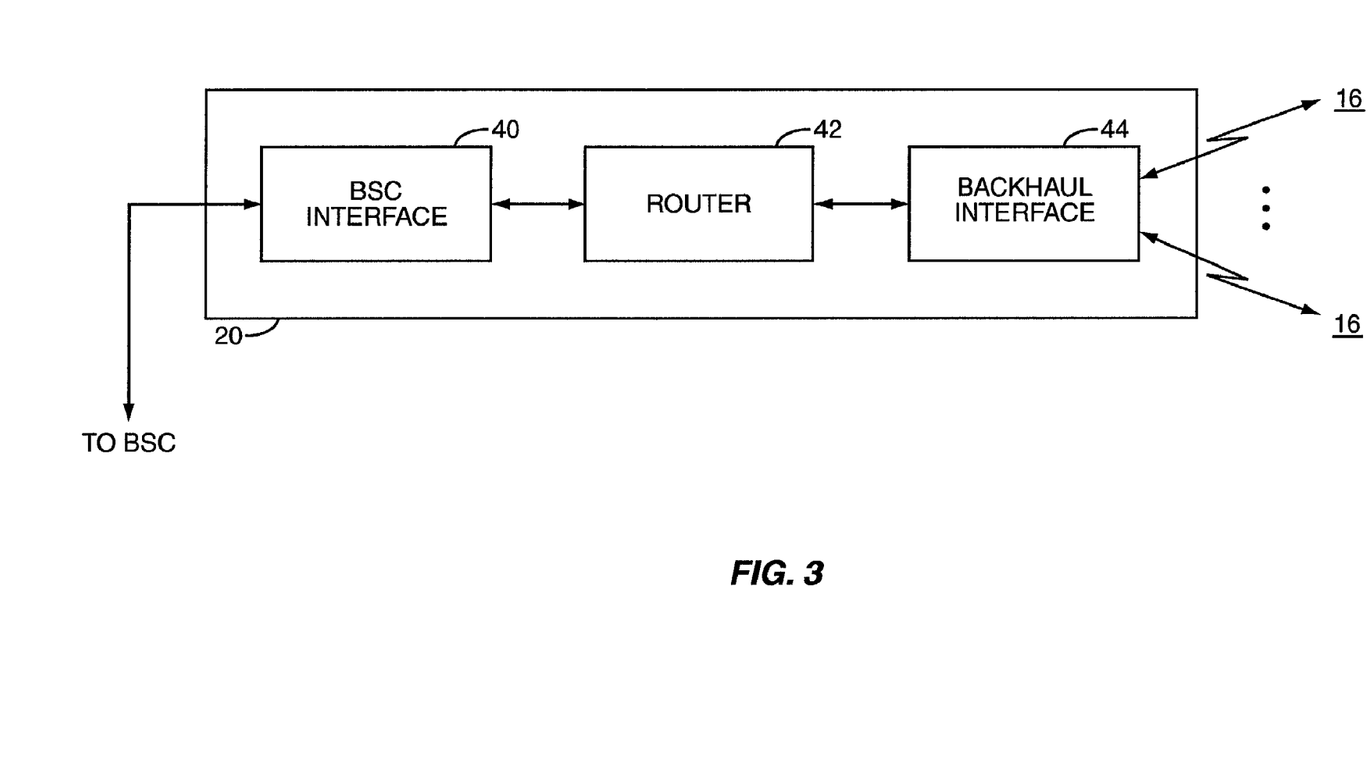
FIG. 3 is a diagram of an exemplary mesh attachment point for use in the radio access network of FIG. 1.

FIG. 3 is a diagram of an exemplary, simplified MAP 20, which comprises a BSC interface 40, a router 42, and a backhaul interface 44. The backhaul interface 44 operates similar to the backhaul interface 30 within each RBS 16, but may support a greater number of channels, or otherwise incorporate changes to maximize the number of RBSs 16 it supports.

MAPs 20 may be positioned as needed, either along the periphery of the mesh 18 or, as shown, within the arrangement of RBSs 16 comprising the mesh 18. Generally, the MAPs 20 and RBSs 16 will implement some form of connection management that determines whether an RBS 16 communicates directly with a MAP 20, or indirectly through one or more intervening RBSs 16. For example, the MAPs 20 may evaluate the signal strength of proximate RBSs 16 to determine which ones meet minimum signal strength requirements. It is advantageous to have multiple RBSs 16 in direct communication with a MAP 20, to avoid communication bottlenecks. For example, if the mesh 18 were coupled to a single MAP 20 by a single RBS 16 within the mesh 18, then that single RBS 16 would have to route all communication traffic to and from the mesh 18.

The MAPs 20 provide interfaces between the BSC 12 and the mesh 18. All traffic and control information to and from individual RBSs 16 in the mesh 18 is routed through the one or more MAPs 20 coupling the mesh 18 to the BSC 12. Because the MAPs 20 carry the aggregate of the mesh traffic and control data, the BSC interface 40 typically comprises a relatively high bandwidth communication interface, and may include one or more landline connections such as T1/E1, or may be based on a wireless connection, such as a microwave link. The router 42 handles routing of packet data traffic and control information to the mesh 18, while the backhaul interface 44 provides backhaul radio links to one or more RBSs 16 within the mesh 18.

In an alternative to the wireless coupling between MAPs 20 and the mesh 18, there may be instances where it is desirable to couple selected RBSs 16 in the mesh 18 to one or more MAPs 20 via landline links. While RF coupling between the mesh 18 and the MAPs 20 as described above is preferred, the present invention does not require it.

To better appreciate operation of the MAPs 20 and that of the mesh 18, it is helpful to look at overall initialization of the mesh 18 and general packet data routing within the RAN 10. As noted, the mesh 18 forms an IP-based network of RBSs 16, each capable of relaying packet data to and from other RBSs 16 within the mesh 18. The network manager 14 provides overall administration and management of the mesh 18, and serves as a centralized element with knowledge of the entire set of RBSs 16 within the mesh 18. For example, the network manager 14 "sees" which ones of the RBSs 16 are linked together, and which ones have access to MAPs 20, and can therefore provide overall routing information for use by the MAPs 20 and RBSs 16 within the mesh 18. Functionality of the network manager 14 may be incorporated into the BSC 12 in some embodiments.

One of the first steps in the deploying the mesh 18 involves initialization of the MAPs 20. As part of the MAP functionality, a configuration and control channel within the wireless backhaul mesh (the radio links between the MAP 20 and the mesh 18, and between RBSs 16) is established with the MAP 20 broadcasting information for the RBSs 16 to synchronize and establish initial connectivity to the MAP 20, either directly or indirectly through intervening RBSs 16 in the mesh 18.

A new RBS 16 seeking admission to the mesh network first receives the MAP broadcast and, once synchronized, begins a connection protocol. The steps for exemplary connection are as follows:

1) the new RBS 16 finds an access channel for the wireless backhaul mesh network and performs synchronization;

2) the new RBS 16 transmits an access request to enter the network (i.e., mesh 18) which includes its capabilities and geographic location;

3) an authentication procedure is performed by the network manager 14 to determine if the new RBS is allowed to enter the network;

4) after authentication is confirmed, the new RBS 16 listens to the wireless backhaul mesh and reports to the network manager 14 the RBS IDs of the neighboring RBSs that can be received on the wireless backhaul mesh and the traffic channels (e.g., CDMA channels for mobile terminal communication) that can be received;

5) the network manager 14 determines the allowable backhaul routes (mesh routes) and stores the new routing information and determines the neighbor lists, such as CDMA neighbor lists, for the new RBS 16;

6) the network manager 14 transmits the applicable wireless backhaul mesh routing information to the new RBS 16 (the new RBS 16 may be a routing point for existing RBSs 16 as well) and updates the routing tables used by the routers 36 of other impacted RBSs 16;

7) the network manager 14 then configures the network 10 and cell parameters for the new RBS 16 and transfers the information to the new RBS 16 as well as updated neighbor lists, power levels, etc. to other impacted RBSs 16 in the mesh 18;

8) the new RBS 16 begins to transmit control information on the wireless backhaul mesh; and 9) the new RBS 16 begins to transmit on the traffic channel(s) (e.g. CDMA channels) assigned to it.

When a RBS 16 is removed from the mesh 18, either planned or due to a fault, the network manager 14 is informed and routing information, power levels, etc are updated and the information is sent to the remaining RBSs 16 in the mesh 18. Also upon removal of a RBS 16 from the mesh 18, traffic channel resources, such as CDMA pseudo-noise (PN) code offset, are either held in reserve for the RBS 16 if a fault was detected and a system operator indicates that the RBS 16 will be put back into operation, or the resource(s) are placed in a pool of resources for new RBSs 16 if the operator indicates that the RBS 16 has been permanently removed from the network.

The BSC 12 or the network manager 14, or a combination thereof, manages the pool of communication resources and oversees resource allocation as regards individual RBSs 16 in the mesh 18. Further, the network manager 14 preferably provides the system operator information regarding the state of the network 10, and particularly regarding the state of the mesh 18. To this end, the network manager 14 may maintain or have access to a database describing the complete network 10, and may provide a display for such information.

With the above network configuration, initialization, and management details in mind, it may be instructive to relate such information to dynamic operation of the network 10. For a given mobile terminal call, communications traffic in the form of IP-based packet data is routed between a particular mobile terminal 22 and the BSC 12. In a VoIP application, for example, packet data flows between a user of the PSDN 24 and the involved mobile terminal 22. This requires the BSC 12 to establish a packet data session with the MSC 26, and to route the relevant packet data to the appropriate MAP 20 once the MSC 26 connects to the appropriate server or servers (not shown) within the PSDN 24.

Packet data to the involved mobile terminal 22 flows from the PSDN 24, through the MSC 26 and BSC 12, and into one of the MAPs 20 associated with the mesh 18. From the MAP 20, it is routed into the mesh 18, where the packet data may hop from RBS 16 to RBS 16, until reaching the final RBS 16 (or RBSs 16) that is supporting the involved mobile terminal 22. Packet data from the involved mobile terminal 22 follows the reverse path, or perhaps a different path as needed, back through the mesh 18 to the BSC 12 and beyond.

Implementing the mesh 18 as a packet data routing network, preferably as an IP-based routing network, imparts significant operating advantages and flexibility. For example, the mesh 18 in conjunction with the network manager 14 may implement self-configuration features that permit individual RBSs 16 within the mesh to configure themselves based on assessing backhaul signal strength with adjacent RBSs 16 and MAPs 20. That is, the network manager 14 and RBSs 16 can automatically determine which neighboring RBSs 16 are available for routing hops, and whether any MAPs 20 are directly accessible from a given RBS 16.

As noted in the above discussion regarding initialization, this information is used in establishing and maintaining the IP routing tables held in the router 36 within each RBS 16. The BSC 12 cooperates with the network manager 14 to relay such information via MAPs 20 to and from the mesh 18.

Figure 4:
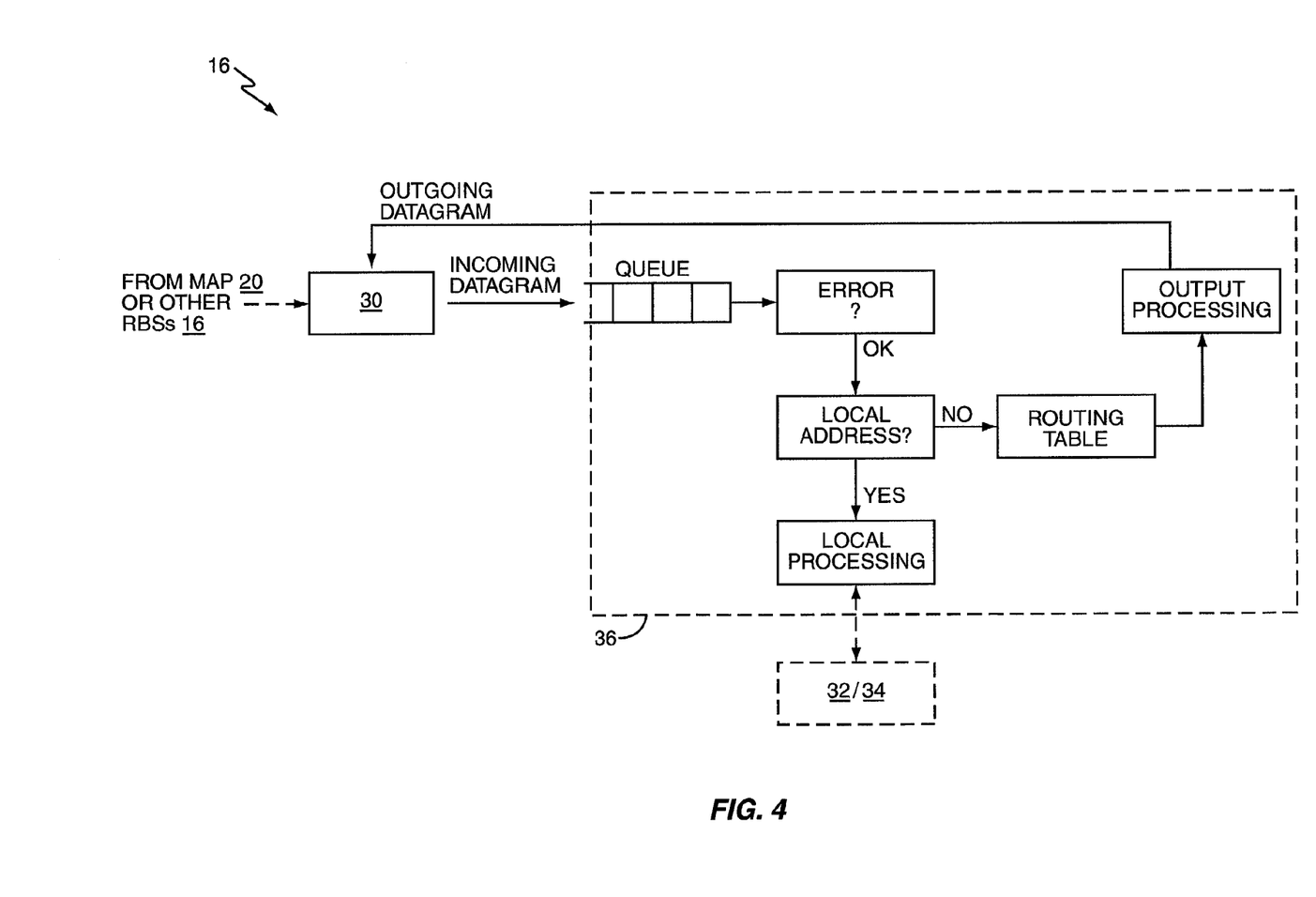
FIG. 4 is a functional data flow diagram for router operations in the radio base stations within the mesh of FIG. 1.

With each RBS 16 being an addressable node within the IP-network of the mesh 18, communication traffic in the form of IP-based datagrams or other packet data message configurations may be flexibly routed through the mesh 18. FIG. 4 illustrates an exemplary IP datagram processing flow for an RBS 16 within the mesh 18.

The router 36 receives incoming communications traffic datagrams through the RBS's backhaul interface 30. Datagrams received through the backhaul interface 30 may be from a MAP 20 or from another RBS 16. The datagram enters an input queue for subsequent transfer to initial error checking. Detected errors may be reported to sending nodes (e.g., previous routing points) as needed; however, if no errors are detected, the router 36 determines if the datagram carries a local address (its own node address). If so, the datagram is passed to local processing, which may include interaction with the controller 34. Local traffic data intended for a mobile terminal 22 being supported by the RBS 16 is passed to the mobile interface 34 for transmission.

If the datagram is not intended for the RBS 16, it is checked against the RBS's routing table. If the destination address in the datagram appears in the routing table, the datagram is output processed, which may include updating "time-to-live," hop index values, or other routing metrics, and setting the next node address. The outgoing datagram is then output by the RBS 16 through its backhaul interface 30.

Figure 5:
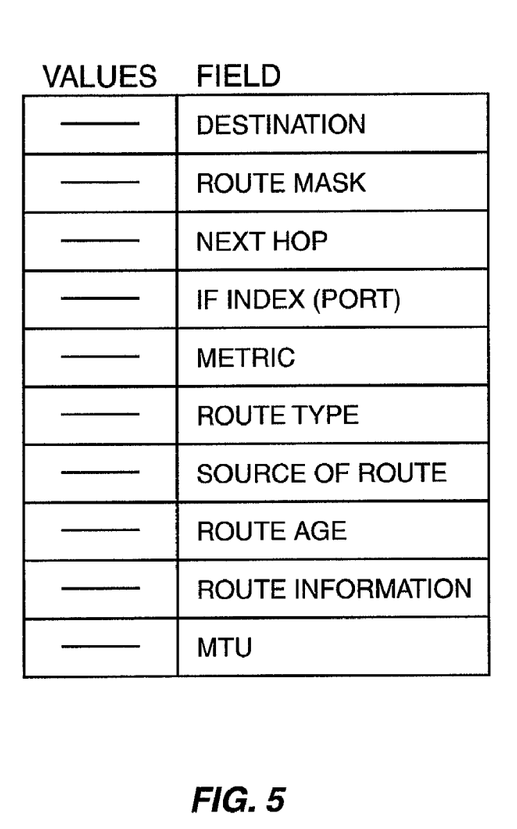
FIG. 5 is a diagram of an exemplary IP routing table used in router operations in the radio base stations within the mesh of FIG. 1.

FIG. 5 illustrates an exemplary routing table as might be used in the above processing by the router 36 in each RBS 16. The route table includes various routing information. For example, the route table typically includes "Next Hop" information identifying the IP address of the next hop in the route, and may include "Metric" or cost information associated with the cost of reaching the destination address. Cost may be assessed in terms of route distance (i.e., the number of hops), or may be assessed in terms of loading (e.g., the relative routing load of other RBSs 16).

The inherent ability to set up route metrics allows the RAN 10 to perform load balancing in the mesh 18. That is, communications traffic may be routed through the mesh 18 in a manner that distributes the traffic such that no one RBS 16 is over utilized as a routing node. The routing tables in the RBSs 16 may be updated during operation to reflect the relative loading of each one. In this way, the amount of communications traffic routed through various ones of the RBSs 16 may be balanced. Such load management prevents traffic congestion in any one RBS 16, and prevents wireless backhaul mesh links (i.e., the RF links within the mesh 18 or to the MAPs 20) from becoming a bottleneck due to link bandwidth limitations.

IP-based routing provides advantages beyond load balancing. For example, the IP headers included in the datagrams may be used to set Quality of Service (QoS) values for the packet data associated with a given call. Thus, parameters such as route latency may be easily established on a per call basis for communications traffic being routed through the mesh 18. The RBSs 16 in the mesh 18 may communicate status information, such as loading, so that each RBS 16 knows at any time the best route through the mesh 18 to a supporting MAP 20. The RBSs 16 may also maintain next-best or alternate routing information. The route path or next-hop choice for any RBS 16 in the mesh 18 may consider reported loading, or other latency factors, as well as a variety of other considerations.

Other advantages include the inherent fault tolerance attendant with flexible routing paths. That is, communications traffic in the mesh 18 may be easily routed around a failed or overloaded RBS 16. Indeed, the mesh topology itself contributes to the fault tolerance because a given RBS 16 in the mesh 18 typically has a substantial number of distinct routes through the mesh available to it. In contrast, other network topologies, such as "spoke-and-wheel" configurations have significantly fewer independent route paths. Additionally, the mesh 18 may be self-configuring, and may be self-adjusting in terms of power or other operating parameters. Many of these advantages stem from the ability to share RBS status and operating information throughout the mesh and by maintaining updated routing tables used by and with regard to the mesh 18.

Additional advantages and features associated with implementing a route-based packet data mesh of RF-coupled radio base stations will be apparent to those skilled in the art. Of course, the present invention may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of providing wireless communication service coverage, the method comprising:

passing communications traffic for a mobile terminal from a base station controller to a mesh of RF-coupled radio base stations;

routing the communications traffic for said mobile terminal through one or more intervening radio base stations in said mesh as needed to reach a serving radio base station;

transmitting the communications traffic for said mobile terminal from said serving radio base station to said mobile terminal;

receiving communications traffic from said mobile terminal at said serving radio base station;

routing the communications traffic from said mobile terminal from said serving radio base station through one or more intervening radio base stations in said mesh as needed to reach said base station controller;

determining the RF coupling between respective ones of said radio base stations comprising said mesh at a central network manager;

generating routing information at said central network manager based on said determined RF couplings; and distributing said routing information to said radio base stations comprising said mesh.

2. The method of claim 1 further comprising:

configuring each radio base station in said mesh as an IP-addressable routing node; and transporting the communications traffic to and from said mobile terminal through said routing nodes in said mesh as IP-based packet data.

3. The method of claim 2 further comprising determining a route through said mesh for packet data comprising the communications traffic associated with said mobile terminal based on the relative amount of additional communications traffic associated with other mobile terminals being routed by individual ones of said radio base stations in said mesh.

4. The method of claim 2 further comprising dynamically updating said route based on changing communications traffic load conditions at said radio base stations in said mesh.

5. The method of claim 2 further comprising dynamically updating said route based on detecting malfunctioning radio base stations within said mesh.

6. The method of claim 2 further comprising:

organizing said communications traffic as IP-based packet data; and routing said communications traffic through said mesh based on IP addressing information contained in IP packet data headers.

7. The method of claim 1 further comprising:

maintaining routing tables in each said radio base station in said mesh; and routing communications traffic through said mesh based on said routing tables.

8. The method of claim 1 further comprising communicatively coupling said mesh to said base station controller through a concentrator that carries the aggregate of communications traffic passing between said mesh and said base station controller.

9. The method of claim 8 wherein communicatively coupling said mesh to said base station controller through a concentrator comprises RF coupling said concentrator with at least one said radio base station in said mesh such that other said radio base stations can relay communications traffic through said at least one said radio base station communicatively coupled to said concentrator.

10. The method of claim 8 further comprising coupling said mesh to said base station controller through at least two said concentrators, such that the aggregate of communications traffic may be split between said at least two concentrators.

11. The method of claim 8 further comprising positioning said concentrator to maximize the number of radio base stations within said mesh with which said concentrator can communicatively couple.

12. The method of claim 1 wherein said mesh of radio base stations carries communications traffic associated with a plurality of mobile terminals and further comprising:

observing relative communications traffic loading between respective ones of said radio base stations comprising said mesh; and updating said routing information in one or more of said radio base stations based on said relative communications traffic loading.

13. The method of claim 1 further comprising:

determining neighbor lists for individual ones of said radio base stations in said mesh identifying adjacent radio base stations in said mesh; and providing said neighbor list information to said individual ones of said radio base stations.

14. The method of claim 1 wherein determining the RF-coupling between respective ones of said radio base stations comprising said mesh at a central network manager comprises evaluating RF signal strength for mesh interface signaling as reported between proximate ones of said radio base stations.

* * * * *